US006952264B2

(12) United States Patent
Kuhns et al.

(10) Patent No.: US 6,952,264 B2
(45) Date of Patent: Oct. 4, 2005

(54) DOSE RADIOMETER

(75) Inventors: David W. Kuhns, Minneapolis, MN (US); Thomas M. Clausen, Minneapolis, MN (US); Olester Benson, Jr., Woodbury, MN (US); Steven R. Vanhoose, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 10/023,376

(22) Filed: Dec. 13, 2001

(65) Prior Publication Data
US 2003/0112438 A1 Jun. 19, 2003

(51) Int. Cl.[7] .............................................. G01N 21/84
(52) U.S. Cl. ...................................... 356/431; 356/429
(58) Field of Search ................................ 356/429, 426, 356/427, 428, 430, 431

(56) References Cited

U.S. PATENT DOCUMENTS 3,502,890 A   3/1970   Heldelman
3,743,844 A   7/1973   Kraty
3,856,990 A * 12/1974  Favreau et al. ............. 348/100
4,321,630 A   3/1982   Kramer
4,435,092 A   3/1984   Iuchi
6,023,066 A   2/2000   Cain et al.

FOREIGN PATENT DOCUMENTS

| GB | 1 441 719 | | 7/1976 | |
| GB | 2278434 | | 11/1994 | |
| JP | 361231404 A | * | 10/1986 | .......... G01B/11/30 |
| JP | 361231404 A | * | 10/1986 | .......... G01B/11/30 |
| JP | 05165344 | * | 2/1993 | .......... G03G/15/16 |
| JP | 05165344 | | 7/1993 | |

OTHER PUBLICATIONS

IBM Technical disclosure, Sep. 1982, Berner et al.*

* cited by examiner

Primary Examiner—Gregory J. Toatley, Jr.
Assistant Examiner—Roy M. Punnoose
(74) Attorney, Agent, or Firm—Rick L. Franzen; Douglas B. Little

(57) ABSTRACT

The invention includes a method for collecting radiation. An electromechanical radiation collection device is disposed in a roll to collect radiation directed at the roll. The invention is also an apparatus comprising a roll having an outer surface. An electromechanical radiation collection device is disposed in the roll.

18 Claims, 9 Drawing Sheets

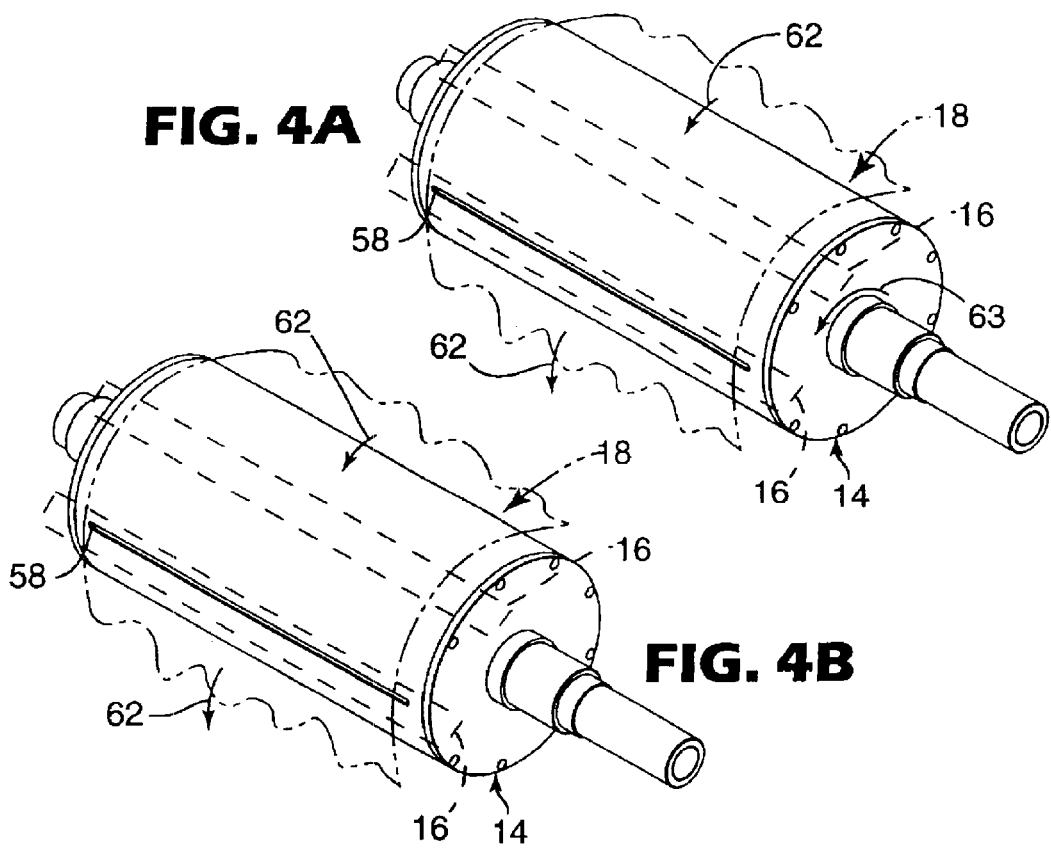
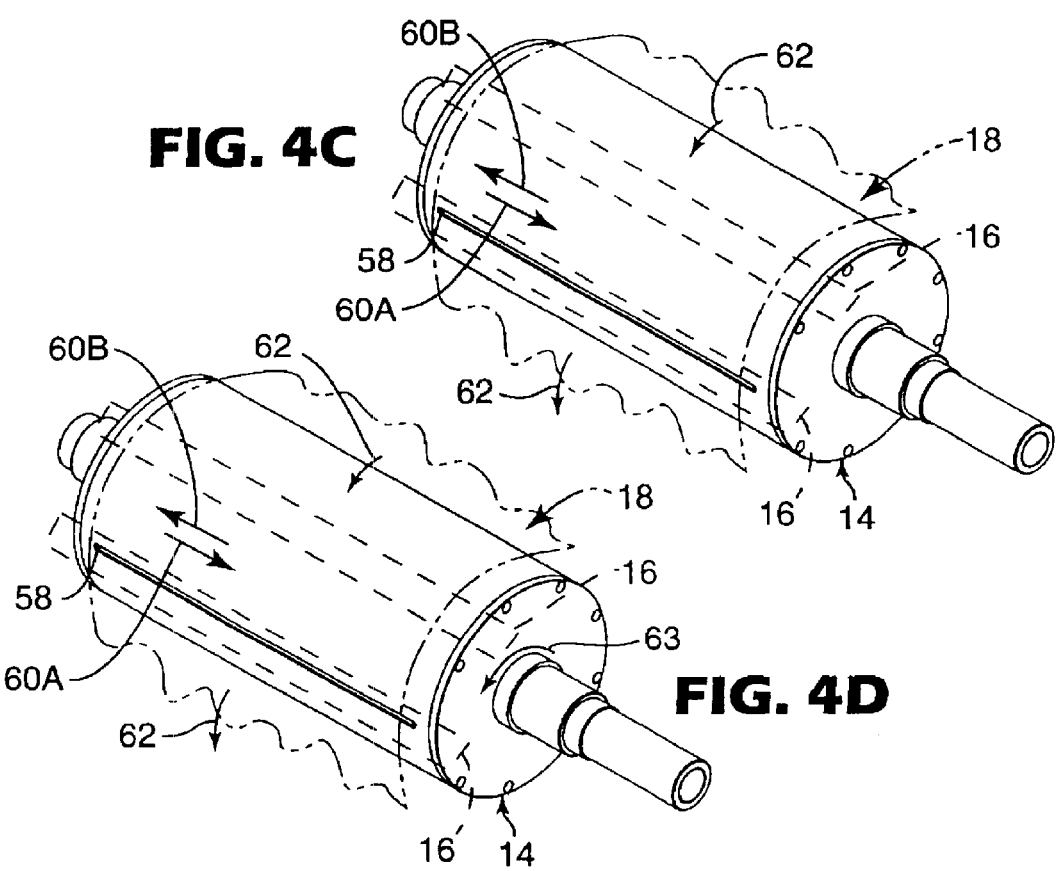

US 6,952,264 B2

DOSE RADIOMETER

BACKGROUND OF THE INVENTION

The invention is a radiant energy collection device. More specifically, the invention is a roll based radiant energy collection and measuring device for use in a process line.

Processing systems using radiant energy sources are known in many industrial processes. One exemplary processing system uses ultraviolet (UV) lamps or bulbs placed near a product in a manufacturing line to cause chemical reactions to occur in or on the product. Often these chemical reactions are referred to as curing (or in some industries as drying). The wavelengths of radiant energy radiated by UV lamps in both the visible and the non-visible spectrum have been found to be particularly effective in transferring energy to the product to effect the desired chemical changes.

The energy wavelengths radiated onto the product typically range from approximately 2.5 micrometers to approximately 190 nanometers. The product being processed by the system can be almost anything, but typically it is a "web" of paper, plastic, or paper-like material (e.g., paperboard). The "web" comprises a continuous stream of material fed through a series of rollers. Radiant energy sources (typically more than one lamp or bulb) are placed at various points along the web to radiate energy onto the web. One or more coatings on the surface of the web, or the web material itself, are caused to undergo a chemical change during this process. In this manner the coating on the web (e.g., ink, lacquer, or adhesives) or the web itself is cured.

Unfortunately, the performance of an individual UV energy lamp (or any other energy source) can vary. A newer lamp may radiate energy more intensely than when it is older. Individual lamps with the same specifications can perform differently. Individual lamps may also perform differently along their length. Specifically, different wavelengths may be emitted more intensely from one lamp to the next. As would be expected, as a lamp grows older, its performance typically declines until it ultimately fails. The power provided to the lamp can also affect the lamp performance. If the electrical service to the lamp fluctuates, specific wavelengths produced by the lamp may vary in intensity. Differences in air temperature surrounding the lamp as well as the time it takes for the lamp to warm up may also cause fluctuations in wavelength intensity. All these variances in the intensity of the radiant energy emitted by the lamp can cause the level of curing of the web to vary. Therefore, in order to optimize the process and provide consistent product it is necessary to monitor the amount of radiant energy emitted by the lamp in order to assure proper curing (i.e., radiation exposure as a function of intensity and exposure time) of the web.

To measure the amount (or "dose") of radiant energy impinging on the web, a detection system is needed. One previous method to evaluate whether the source was providing adequate radiant energy was to test the web downstream from the lamp. Although this gave a very accurate measurement of whether the web had been properly cured, the measurement took place too late in the process, since product which had not been properly cured could not be used, and was thus discarded.

An alternate measurement method was to use electronic devices such as compact integrating radiometers (known in the art) placed on the web and moved with the web between the lamp and the web to provide a test measurement of the amount of radiant energy being emitted by the lamps. While this method gave a more direct measurement of lamp performance, it was performed during setup and not during actual production so that no information was being gathered as to energy impinging the web during the actual run time process. In particular, no measurements of variances in the radiant energy impinging the web were able to be taken. Once again, improperly cured product resulted. Additionally, passing the web through nip points and idler rolls, as is required in some casting processes, could damage the compact integrating radiometers before measurements could be obtained.

Another alternative method was to use actinometric devices to measure the amount of radiation. An actinometric device's chemical composition changes as it is exposed to radiation. Examples of actinometric devices are tapes or films embedded with a substance that changes color in response to radiation. Although these devices can pass through nips, they must be manually placed on the web to expose them to radiation, and manually removed to obtain a reading. They are not continuous measures of radiation in a process.

Another method was developed which monitored the energy draw of the power supply for each lamp, in an attempt to provide a "real time" measurement of the actual energy used by the lamp. This measurement was a very rough and inaccurate way to estimate the amount of radiant energy emitted by the lamp and impinging on the web on a continuous basis. Although inaccurate, this method was an attempt to determine how much radiant energy was impinging onto the web in "real time". Measuring the radiant energy in "real time" made it possible to more accurately control the curing time of the web (e.g., by changing the pace of the web through the process to provide longer or shorter processing time) and reduce loss of product. Unfortunately, many factors made the measurement of the energy drawn from the lamp an inaccurate measurement of the radiant energy impinging the web defeating any advantages gained by the real time measurements. For example, as the lamps themselves degraded due to aging, the amount of energy drawn by the lamp could change relative to the amount of radiation emitted. Additionally, the radiation emitted for a specific amount of power drawn varied from lamp to lamp. To alleviate these problems, electronic detection devices were placed around the lamp to measure the direct output of radiant energy emitted from the lamp. However, the environmental conditions surrounding the process (e.g., high humidity, high temperature, RF radiation, and foreign objects such as airborne adhesive, lacquer, etc.) often caused the electronics in the detectors to break down and malfunction.

Finally, remote collection devices have been developed which allow the radiant energy emitted by the lamp to be collected and transported (typically by fiber optic cables) to a detection device placed remotely from the hostile environment surrounding the web. These devices were placed on the backside of the lamp (opposite the web), allowing a direct measurement of the amount of radiant energy emitted by the lamp to be taken. This placement of these devices on the opposite side of the lamp from the web was done for two main reasons: first, there was very little space between the web and the lamp and second, because the most hostile environment in the process is directly between the web stream and the surface of the lamp housing. The space between the web and the lamp was small in order to keep contaminants such as oxygen (which can affect curing of the web in some processes) to a minimum, as well as assuring that a maximum amount of radiant energy from the lamps impinged the web. The environment is extremely hostile at this position since it is most directly in contact with the radiation and heat from the lamp as well as the adhesive and airborne contaminants from the web.

While remote collection devices solved some of the problems described above, they still did not deliver accurate measurements of radiant energy intensity impinging the web. Typically, a transparent cover is placed over the lamp in order to protect the lamp elements from airborne contaminants. This transparent cover becomes clouded over time (due to airborne contaminants), which prevents a portion of the radiant energy emitted by the lamp from impinging upon the web. Thus, collection devices placed at the back of the lamp do not see this degradation, and an accurate measurement of energy radiated onto the web cannot be attained. None of the devices allowed for the real time collection of radiant energy at the web.

SUMMARY OF THE INVENTION

One embodiment of the invention includes a method for collecting radiation. An electromechanical radiation collection device is disposed in a roll to collect radiation directed at the roll.

Another embodiment of the invention is a method for measuring radiation. A radiation collecting device is disposed in a roll. The roll has an outer surface and the collection device is disposed at a plane tangential to the outer surface. A web is disposed between a radiation source and the collection device. Radiation directed at the roll is collected, and characteristics of the collected radiation are measured.

Still another embodiment of the invention is an apparatus comprising a roll having an outer surface. An electromechanical radiation collection device is disposed in the roll.

Another embodiment of the invention is an apparatus including a roll having an outer surface. An opening sufficient to allow passage of radiation is disposed in the outer surface. A radiation collection device is movably disposed in the opening. A measurement device remotely disposed from the collection device is included in the apparatus. The measurement device is connected to the collection device so as to receive radiation collected by the collection device. A drive assembly is connected to the collection device. The drive assembly operates to translate the collection device along the length of the opening.

DESCRIPTION OF THE DRAWINGS

FIG. 4A is a perspective view of one embodiment of the inventive energy collection device.

FIG. 4B is a perspective view of one embodiment of the inventive energy collection device.

FIG. 4C is a perspective view of one embodiment of the inventive energy collection device.

FIG. 4D is a perspective view of one embodiment of the inventive energy collection device.

While the above-identified drawing figures set forth one embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION

Figure 1:
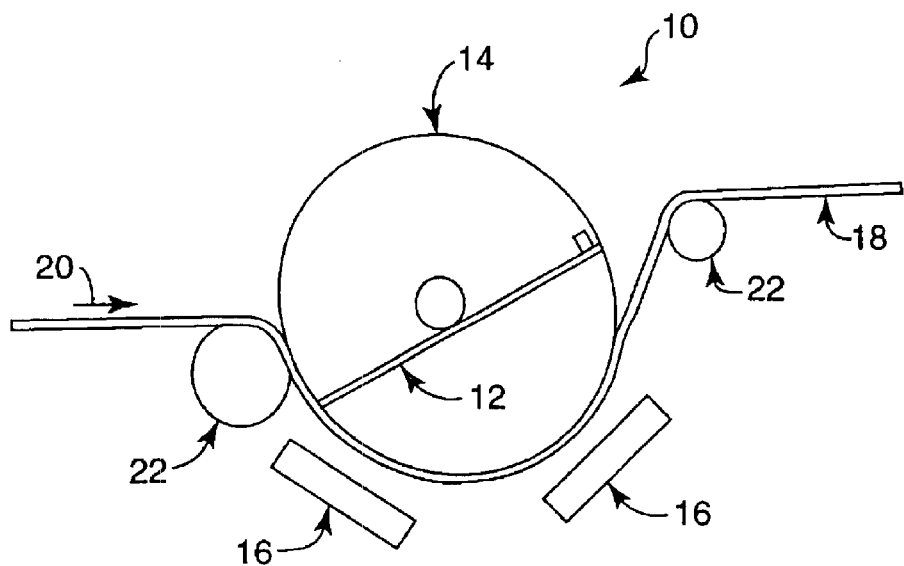
FIG. 1 is a schematic illustration showing the one embodiment of the inventive collection device.

One embodiment of inventive energy collection apparatus 10 is shown in an exemplary industrial process in FIG. 1. Energy collection apparatus 10 includes instrument assembly 12 mounted inside roll 14. Radiation sources 16 (e.g., ultra-violet (UV) lamps or radiation emitters) are disposed adjacent to roll 14. Continuously streaming web 18 (e.g., a paper, polymer, cloth or metal based material) is advanced in direction 20 past the radiation sources 16. Guide rolls 22 can be utilized to direct web 18 onto roll 14. Web 18 (which hereinafter will be assumed to include any adhesives or other layers applied to a substrate material) is cured by radiant energy emitted from radiation sources 16 as web 18 proceeds between radiation sources 16 and roll 14. Energy collection device 10 allows the real time collection of radiant energy being directed at web 18. Web 18 is disposed between roll 14 and radiation sources 16.

For purposes of the present invention, a roll is a cylindrical rotating or stationary device generally used to transport a web through a process. The roll may be constructed with or without bearings to facilitate motion. The surface of the roll used in contacting the web may be constructed of metal, glass, plastic, composite materials, such as ceramic or carbon fiber, or combinations of the noted materials. Those skilled in the art are capable of selecting specific rolls, roll dimensions, and materials to match desired processes and web materials.

It should be noted that although the following description describes the energy collection device 10 as being configured for use in an application using UV radiation emitted at a paper or polymer based web, this is being done for exemplary purposes only. All conventional forms of radiation are suitable for use with the present invention. Non-limiting forms of radiation may include, for example, UV, infrared, visible light and electron beam radiation. The inventive collection device 10 can be used in a multitude of other web or foil based process applications utilizing a roll or roll equivalent. For example, a curing process utilizing electron beam type radiation may also use the inventive energy collection apparatus 10 . Since the process described refers to using a UV type radiation for curing the web 18 , the term "radiation source 16" will be used interchangeably with "lamps 16".

Figure 2:
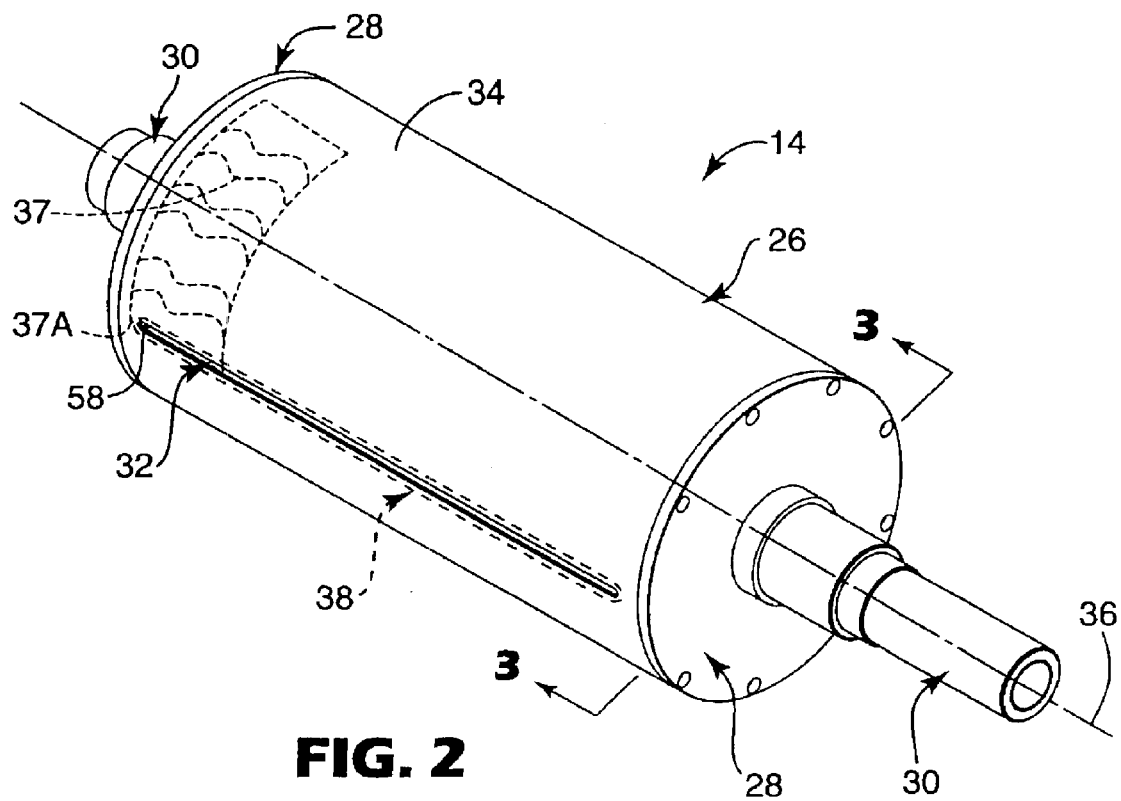
FIG. 2 is a perspective view of one embodiment of the inventive energy collection device.

FIG. 2 shows a perspective view of roll 14 including jacket 26, end caps 28 and support shaft 30. Roll 14 is typically made of aluminum and in one embodiment is approximately 23¾ inches (60.325 cm) long and has a diameter of approximately 12 inches (30.48 cm). Slot 32 is machined completely through an annular outer wall 34 of roll 14. In one embodiment, annular wall 34 is between approximately ¾ inch (19.05 mm) to approximately 1 inch (25.4 mm) thick. Shaft 30 is connected to end caps 28, which in turn are typically bolted to jacket 26. End caps 28 are typically made of aluminum. Shaft 30 defines a longitudinal axis 36 of roll 14 and typically allows the roll 14 to rotate with respect to a provided support structure (not shown). This rotational connection can be accomplished in any number of ways known to those skilled in the art, including placing bearings (not shown) between the shaft 30 and end cap 28 interface, or between the shaft 30 and support structure (not shown). Shaft 30 may also act as a conduit (e.g., for wiring of components disposed internally in roll 14) and/or a pipe (e.g., for liquids used to cool jacket 26). A rotary slip ring (not shown) such as slip ring model number AC6023-24 manufactured by Litton Poly Scientific of Blacksburg, Va. may be used with roll 14 to provide wire couplings to the rotatable roll 14. Similarly, a rotary water union (not shown) may be provided with roll 14 to provide a coupling allowing cooling liquid to be directed to and from roll 14. Rolls are common in web based processes, and although a specific roll is described, it should be noted that a wide variety of rolls may be used without departing from the spirit and scope of the invention. For example, while roll 14 is illustrated as having a smooth annular wall 34, roll 14 may be a flexographic type roll or printing type roll using a series of raised patterns 37 (shown in dotted lines) to imprint the web. Slot 32 can be disposed through roll 14 along a break or "seam" 37A in the pattern so as to not affect the processing of the web by the roll. Additionally, other types of annular surfaces used in web based applications (e.g., slide bars and turns) may be utilized without departing from the spirit and scope of the invention.

Other embodiments of the invention include a slot which extends only partially along the longitudinal length of the jacket 26. Alternately, multiple slots (or holes) can be disposed through jacket 26 at various positions longitudinally along roll 14 and/or radially about roll 14. A material transparent to the radiation being collected by the energy collection device (i.e., a window 38, shown in dotted lines) can be placed over slot 32 to prevent the ingress of any substances which can harm components internal to roll 14, or egress of substances which are contained by roll 14. Alternatively, the entire roll could be made of material transparent to the radiation so as to allow radiation to pass through jacket 26 and impinge collection device 58.

Figure 3:
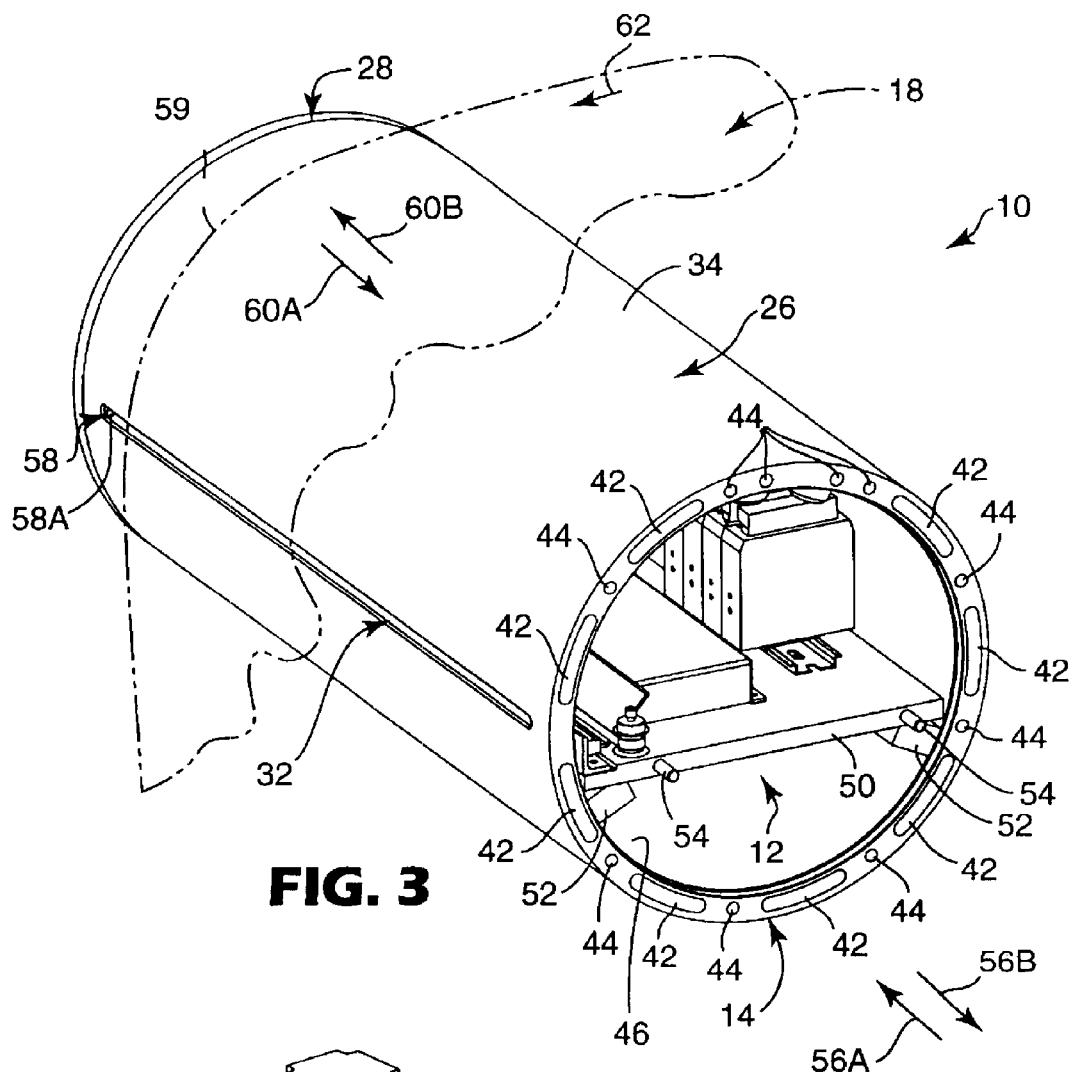
FIG. 3 is a partial view of the inventive energy collection device as taken along line 3—3 in FIG. 2.

FIG. 3 shows a view of roll 14 as taken along line 3—3 of FIG. 2. Cooling channels 42 are shown extending into jacket 26 and are typical features found in casting rolls. Gun-drilled holes (e.g., approximately ⅜ inch to approximately ½ inch (9.525–12.7 mm) diameter recesses (not shown), are typically bored into jacket 26 to provide a path for cooling liquid (e.g., water) throughout jacket 26. Aluminum cover pieces (not shown) may be welded over cooling channels 42 to seal cooling liquid into channels 42. Bolt holes 44 allow end caps 28 to be bolted to jacket 26. Inner wall 46 of jacket 26 is also shown.

Instrument assembly 12 is shown secured inside roll 14. Instrument assembly 12 includes plate 50 supported on plate mounts 52. Plate mounts 52 and plate 50 are secured (e.g., using bolts) to inner wall 46 of jacket 26. Dowel pins 54 are inserted into plate 50 and partially into each end cap 28 (on longitudinally opposite ends of plate 50) to provide additional mounting points and structural support to plate 50. By removing one end cap 28 and unbolting plate 50 from jacket 26, plate 50 can be slideably removed from or inserted into roll 14 as illustrated by arrows 56A and 56B. Collection device 58 is illustrated extending from interior of roll 14 into slot 32. Collection device 58 is able to receive and direct radiation which impinges on its surface. In the illustrated embodiment, collection device 58 is bundled fiber optic cables which are able to receive and direct UV radiation. In other embodiments, the collection device may vary according to the application in which the invention is being used. Specifically, the type of radiation being collected may require the use of different types of collection devices. Light tubes, mirrors, lenses, silicon detectors (e.g., photodiodes or charged coupled devices), cadmium sulfide detectors, gallium arsinide detectors, thermopiles, separation detectors and scintillation detectors are some examples of the many collection devices which can be used in the inventive energy collection apparatus 10. It should be noted that these examples are provided for illustrative purposes only, and should not be construed to limit the invention to those listed collection devices.

Collective device 58 is disposed into slot 32 so as to be disposed at or radially inward from a plane tangential to the outer surface. In other words, if slot 32 were not included in roll 14, collection device 58 would be at or radially inward from where the outer surface would extend over the slot. Positioning collection device 58 in such a manner allows the collection device to directly measure the radiation at the point where the web 18 (shown in dotted lines) is being impinged by the radiation emitted by the radiation source (e.g., ultra-violet lamps). Additionally, by positioning collection device 58 at or radially inward from annual wall 34, web 18 is not affected (e.g., no bumps or protrusions are pushed into web 18) by collection device 58. Collection device 58 itself is protected by web 18 from contaminants in the environment external to roll 14. Also, this positioning of collection device 58 protects collection device 58 from contact with a nip or guide roll (which may typically be placed within 25 microns from the roll) and could contact a collection device extending past the outer surface of the roll so as to mechanically damage the collection device. While tip 58A of collection device 58 is illustrated as being positioned in substantially the same plane as the annular wall 34, alternative embodiments of the invention would dispose tip 58A at any position radially inward from annular wall 34. Collection device 58 can be translated along slot 32 to receive radiation at various points along roll 14. Additionally, the inventive energy collection apparatus 10 can be configured such that web 18 only covers a portion of slot 32. This positioning of web 18 allows collection device 58 to be translated past longitudinal edge 59 of web 18, allowing sampling of radiation outside longitudinal edge 59 of web 18 so as to provide reference data points. Alternatively, web 18 can be disposed so as to cover the entirety of slot 32. While positioning collection device 58 at or radially inward from outer surface of annular wall 34 is preferred for the reasons described above, it is contemplated that process applications could arise where it would be beneficial to extend the collection device past the outer surface of annular wall 34.

The inventive apparatus 10 can be used in two basic ways, with or without the web. In one use, roll 14 is mounted into position in a particular process application while no web is being run. This allows the operator to measure the radiation being emitted from the lamp and calibrate the process, establishing appropriate levels of emitted radiation before running product. Additionally, the energy collection apparatus can easily be removed from one process line and placed in a different process line. Thus, web can be run on a "pilot" or test process line with the inventive apparatus in place. The amount of radiation emitted onto the web can be varied until the web is sufficiently processed (e.g., cured). The web can then be removed and the collection apparatus used to determine the level of radiation being emitted by the radiation source. The collection apparatus can then be transferred to a different line and the radiation source adjusted to precisely replicate the level of radiation impinging the collection apparatus. When the same type of web is run on the second product line, the same level of radiation will impinge the web, properly curing it. Thus, calibration time and wasted product can all be reduced. The invention provides the ability to precisely replicate the level of radiation at substantially the exact same position between the different lines. This cross-calibration can then be repeated on different process lines allowing quick start-up of each process line. Thus, the calibration process is greatly simplified and can reduce the amount of training for operators to correctly calibrate the system. Additionally, since the operator does not need to touch the web or roll in order to calibrate the system, as was required by previous calibration methods (e.g., compact integrating radiometers or actinometric devices), the risk to the welfare of the operator and the system is reduced (e.g., clothing or fingers catching in equipment, the web catching on fire, etc.).

In another use, the energy collection apparatus can be left in the process line as the web is run. By continuously monitoring the level of radiation passing through the web and impinging the collection device 58, variations in the process can be observed and corrected in "real time", allowing the process to be optimized. For example, if the level of radiation passing through the web decreases due to aging of the radiation source, the collection apparatus will detect the decreased radiation and provide feedback directing the power to the source to be increased, thereby increasing the intensity of the radiation impinging the web. Similarly, if variations in web thickness or web material properties occur, the collection apparatus will observe a rise or drop in the amount of radiation passing through the web and provide feedback to adjust the intensity of the radiation source, or the speed of the web.

As discussed previously, although one slot 32 is shown extending longitudinally along roll 14 in FIGS. 1–3, any number of variations as to the number and positioning of the slots (or holes) extending through roll 14 can be made without departing from the spirit and scope of the invention. For example, alternate embodiments of the invention may utilize multiple holes, each having a collection device extending from the interior of the roll into the hole. Alternatively, multiple collection devices can be used in a single slot. Using multiple collection devices provides the opportunity to simultaneously collect multiple measurements at different points along the web. The determination of the location and number of slots and collection devices can vary according to the process application as well as the data desired by the operator.

Figure 4:
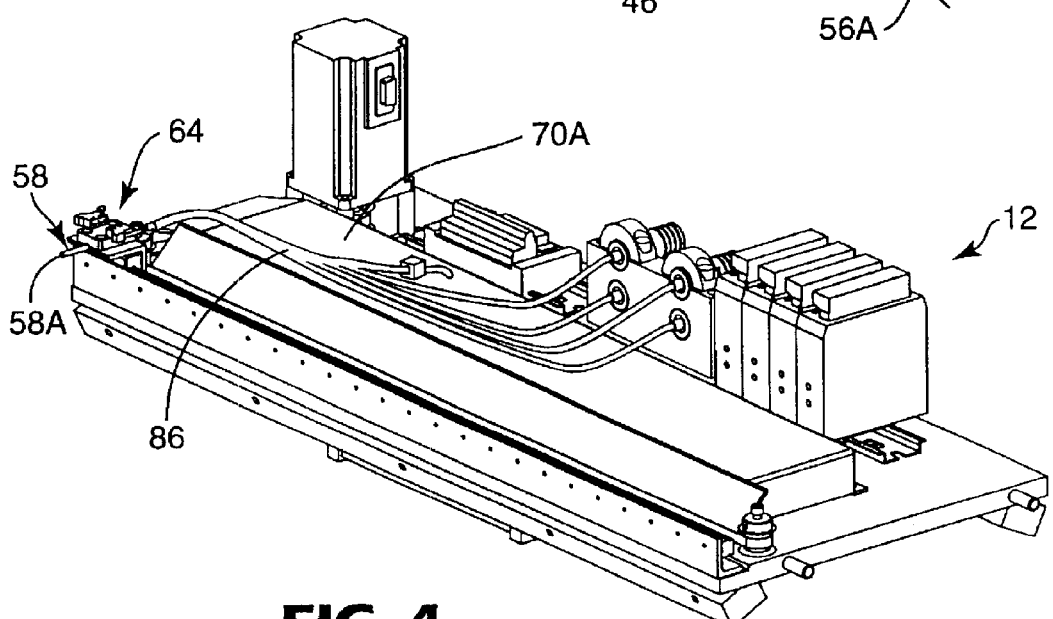
FIG. 4 is a perspective view of one embodiment of the inventive energy collection device instrument assembly.

In the embodiment illustrated in FIG. 3, one collection device 58 is utilized and can be translated longitudinally along slot 32. Translating collection device 58 longitudinally along slot 32 allows the sampling of radiation at points transversely across web 18 (see arrows 60A and 60B) as well as at points along the direction of travel of the web (i.e., "upstream" and "downstream", see arrow 62 ). As illustrated in FIG. 4, the collection device 58 is supported and translated along instrument assembly 12.

The ability to move collection device 58 along the length of slot 32 provides a variety of ways to collect radiation samples along and across the web. For example, as illustrated in FIG. 4A, roll 14 can be rotated (arrow 63) and radiation collected at a single position transversely and longitudinally on web 18 (shown in dotted lines) through the full range of exposure to radiation emitted by radiation sources 16 (shown in dotted lines).

As illustrated in FIG. 4B, roll 14 can be held stationary, and collection device 58 maintained at a single position transversely across roll 14, providing a measurement at a single position through the range of radiation emitted by radiation sources 16 and at a series of points in the longitudinal direction of web 18 (as web 18 is pulled past collection device 58).

As in FIG. 4C, roll 14 can be held stationary as web 18 is pulled past collection device 58. Collection device 58 can be translated across web 18 (see arrows 60A and 60B) providing collection at points transversely and longitudinally along web 18.

FIG. 4D illustrates that roll 14 can be rotated (arrow 63) while collection device 58 is translated, collecting radiation transversely (arrows 60A and 60B) across web 18 along a single transverse line of the web, through the range of radiation emitted by radiation source 16. Variations on any of the above sampling methods are contemplated as well. For example, collection device 58 can be indexed transversely across web 14 after each revolution of roll 14.

Figure 5:
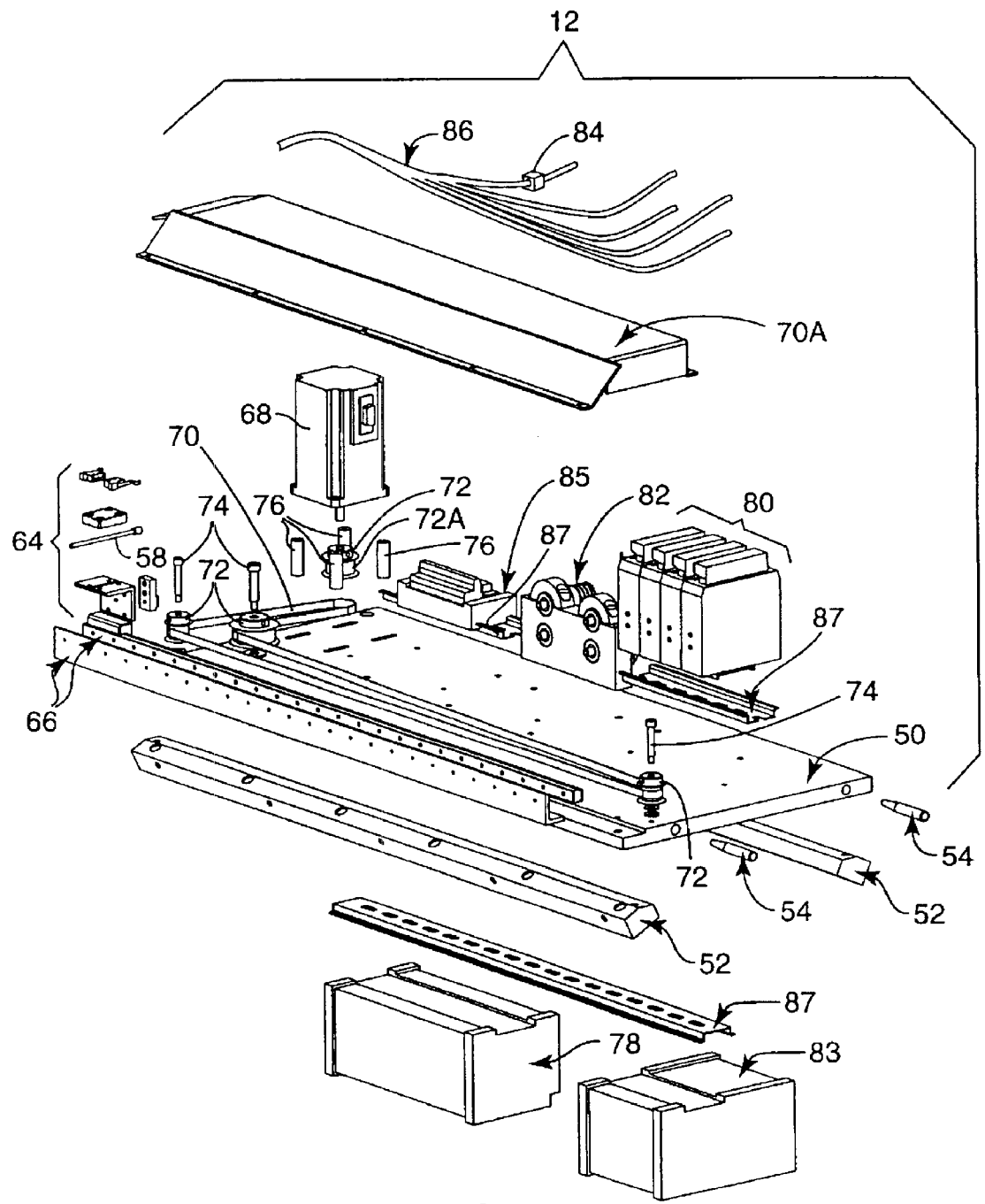
FIG. 5 is an exploded perspective view of one embodiment of the inventive energy collection device instrument assembly.
Figure 6:
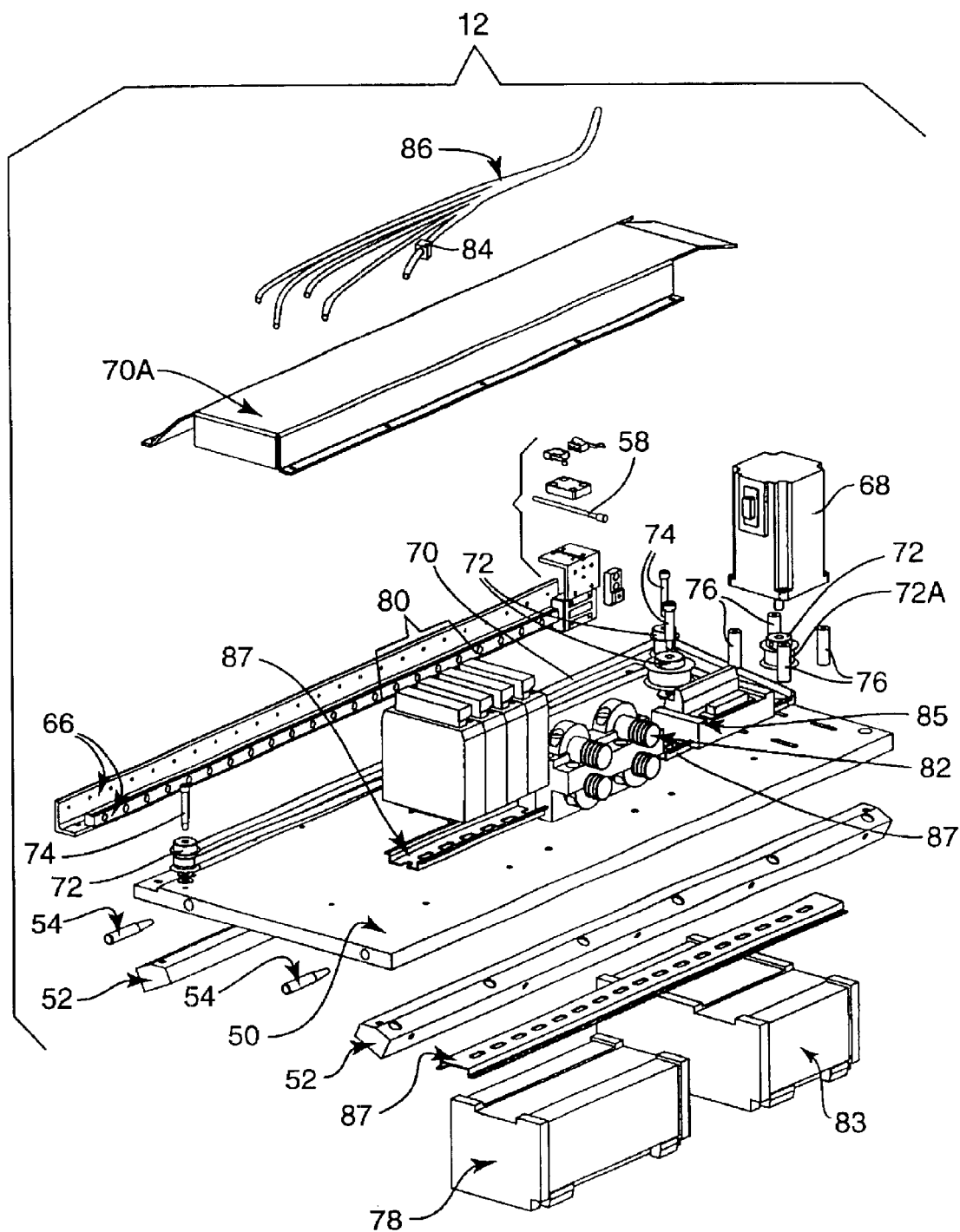
FIG. 6 is an exploded perspective view, reversed with respect to FIG. 5, of one embodiment of the inventive energy collection device instrument assembly plate.

As best shown in FIGS. 5 and 6, in addition to the components discussed previously (with respect to FIGS. 3 and 4) instrument assembly 12 includes mount assembly 64, linear rails 66, servo motor 68 (such as model number "Silvermax QCI-23-3", manufactured by Quick Silver Controls, Corvina, Calif.), timing belt 70 (such as model number 570XL025, manufactured by Gales Rubber Company, Denver, Colo.), guard 70A, pulleys 72, screws 74, spacers 76, power supply 78 (such as a Quint-PS power supply manufactured by Carlton-Bates Company, Palatine, Ill.), measurement instruments 80 (such as EIT UV detectors, manufactured by EIT, Sterling, Va.), monitor mounting assembly 82, spectrometer 83, adjustable blocking in-line fiber filter 84 (such as is manufactured by OZ Optics, Ontario Canada), terminal block 85 and bundled connecting cable 86 (which in one embodiment comprises five fiber optic cables, such as is manufactured by CeramOptec, East Longmeadow, Mass). DIN rails 87 are used to secure components to plate 50. Belt 70 is secured to mount assembly 64 and wrapped about pulleys 72. One pulley 72A is driven by servo motor 68. Mount assembly 64 is slideably supported by linear rails 66 along the length of plate 50. By causing servo motor to rotate pulley 72A, belt 70 will drive mount assembly 64 along the linear rails 66. Collection device 58 is secured to mount assembly 64 (discussed further with respect to FIGS. 7 and 8). Thus, collection device 58 can be selectively positioned along the length of linear rails 66 (and consequently along the length of slot 32) using servo motor 66. Guard 70A prevents anything from accidentally interfering with belt 70 and pulleys 72. It should be understood that the configuration of the instrument portion of the inventive collection apparatus can vary according to the process application the inventive apparatus is used in, as well as the desired data to be collected.

Once the radiation impinges the collection device 58, collection device 58 directs the collected radiation through the fiber optic cables in the bundled connecting cable 86 to monitor mounting assembly 82 which acts to terminate four of the fiber optic cables and direct the collected radiation to the measurement instruments 80. Measurement instruments 80 analyze the radiation to ascertain levels of various characteristics of the radiation, such as intensity, wavelength, polarization energy distributors, number of accelerated particles, or any other characteristic which it is desirable to monitor. As discussed, in one embodiment the measurement instruments are UV (ultra-violet) detectors. These detectors contain UVA (defined as radiation having wavelengths from 320 to 390 nanometers long), UVB (wavelengths from 280 to 320 nanometers), UVC (wavelengths from 250 to 260 nanometers) and UVV (wavelengths from 395 to 445 nanometers) filters to allow the measurement of intensity levels for each of these types of UV radiation. The detectors also include amplifiers to drive the detectors and send the resulting electrical signal out of the roll.

High resolution spectrometer 83 such as an Ocean Optics S2000, manufactured by Ocean Optics, Dunedin, Fla. is disposed under plate 50. Radiation collected by the collection device 58 is sent via one of the fiber optic cables from bundled connecting cable 86 to spectrometer 83. In the embodiment illustrated, the fiber optic cable is first connected to adjustable blocking in-line filter 84 providing a reduction in the intensity of the radiation being directed by the optical cable, which is more suitable for the spectrometer. The output of adjustable blocking in-line filter 84 is directed through guard 70A and plate 50 to an interface with spectrometer 83.

While measurement instruments 80 and spectrometer 83 are included on the instrument assembly inside roll 14, it should be understood that these may alternately be mounted externally to roll 14. When instruments are mounted externally to roll 14, the fiber optic cables from bundled connecting cable 86 are directed through a rotary slip ring (not shown but known in the art) to the measuring instruments and/or the spectrometer. In the illustrated embodiment, internally mounted measurement instruments 80, spectrometer 83 and servo motor 68 are typically connected by wires through terminal block 85 to wires extending through the shaft via the slip ring (discussed previously) to an external controlling/monitoring device (not shown) such as a computer or programmable logic controller (PLC). Controlling the servo motor 68 with an external device allows the collection points, and frequency of collection to be altered as desired by the operator. Connecting the data output to an external controller allows the data to be read and processed on a real time basis so that if alterations in system are required to assure correct processing of the web (such as increasing radiation intensity, decreasing throughput speed of the web, etc.) the controller can automatically compensate to balance the system to assure proper curing time of the web. Additionally, by connecting the inventive apparatus 10 to a remote computer, data analysis can occur remotely from the process lines. The computer may be tied into a network, allowing access to the data from locations outside the process facility thereby allowing engineers and scientists remotely located from the manufacturing facility the ability to review and analyze the data obtained by the inventive apparatus on a real-time basis.

Again, while the illustrated embodiment utilizes radiation measuring devices (i.e., UV detectors, spectrometers) other devices which can measure other types of radiation can be connected (internally or externally to the roll) to the collection device.

Figure 7:
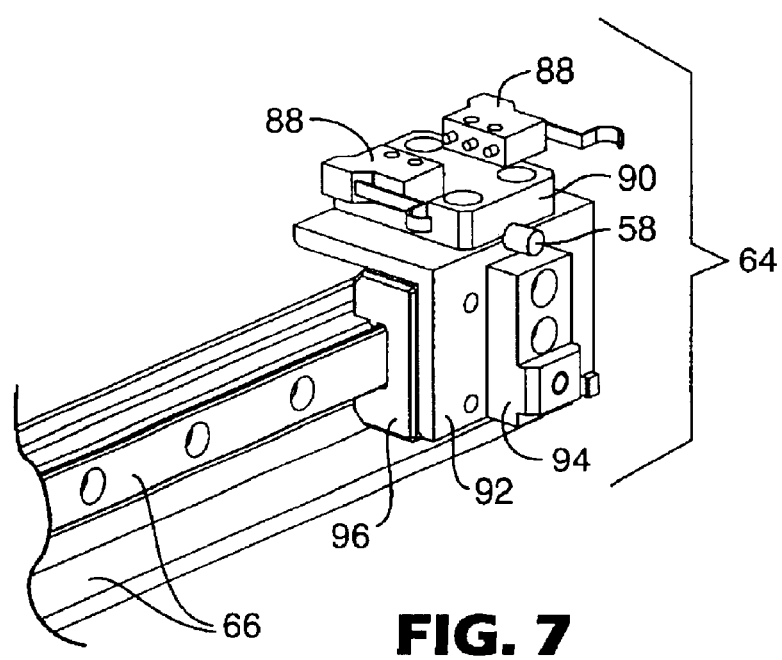
FIG. 7 is a perspective view of one embodiment of an optical head.
Figure 8:
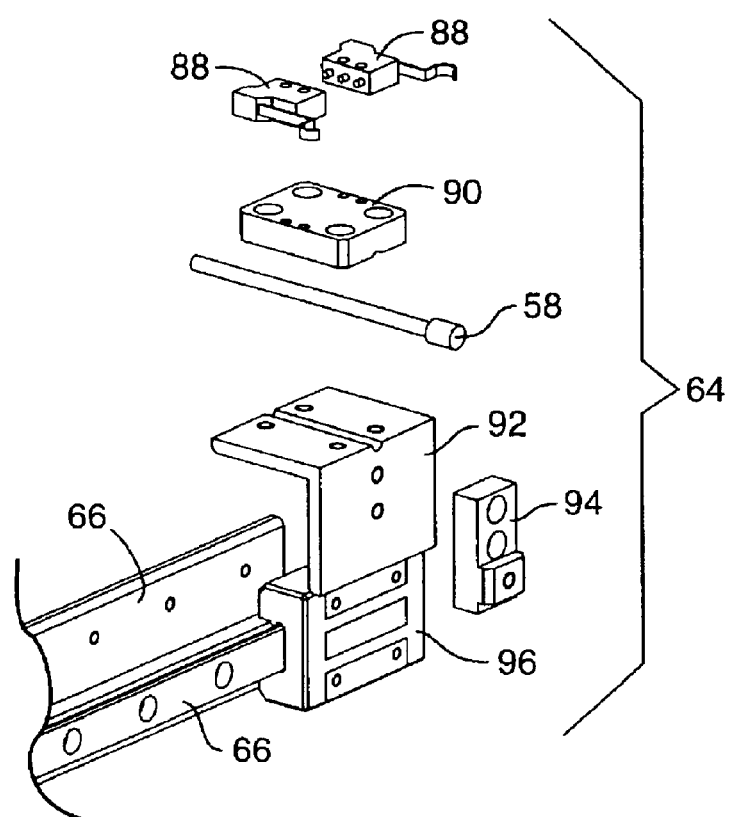
FIG. 8 is an exploded perspective view of one embodiment of an optical head.

FIGS. 7 and 8 illustrate the mount assembly 64 in greater detail. Mount assembly 64 includes switches 88, sensor block 90, bracket 92, belt mount 94, and carriage 96. Belt mount 94 (driven by belt 10 as previously described) is secured to bracket 92 which in turn is secured to carriage 96. Collection device 58 is secured to bracket 92. Carriage 96 portion of mount assembly 64 is forced to translate longitudinally along linear rails 66 by belt, thereby providing a motivating force to mount assembly 64. Switches 88 are used as "limit" switches. When mount assembly 64 reaches either end of linear rails 66, one of the switches 88 engages, sending a signal to the servo motor 68 (shown in FIG. 6) to stop translation of mount assembly 64 in that direction.

EXAMPLE

Figure 9:
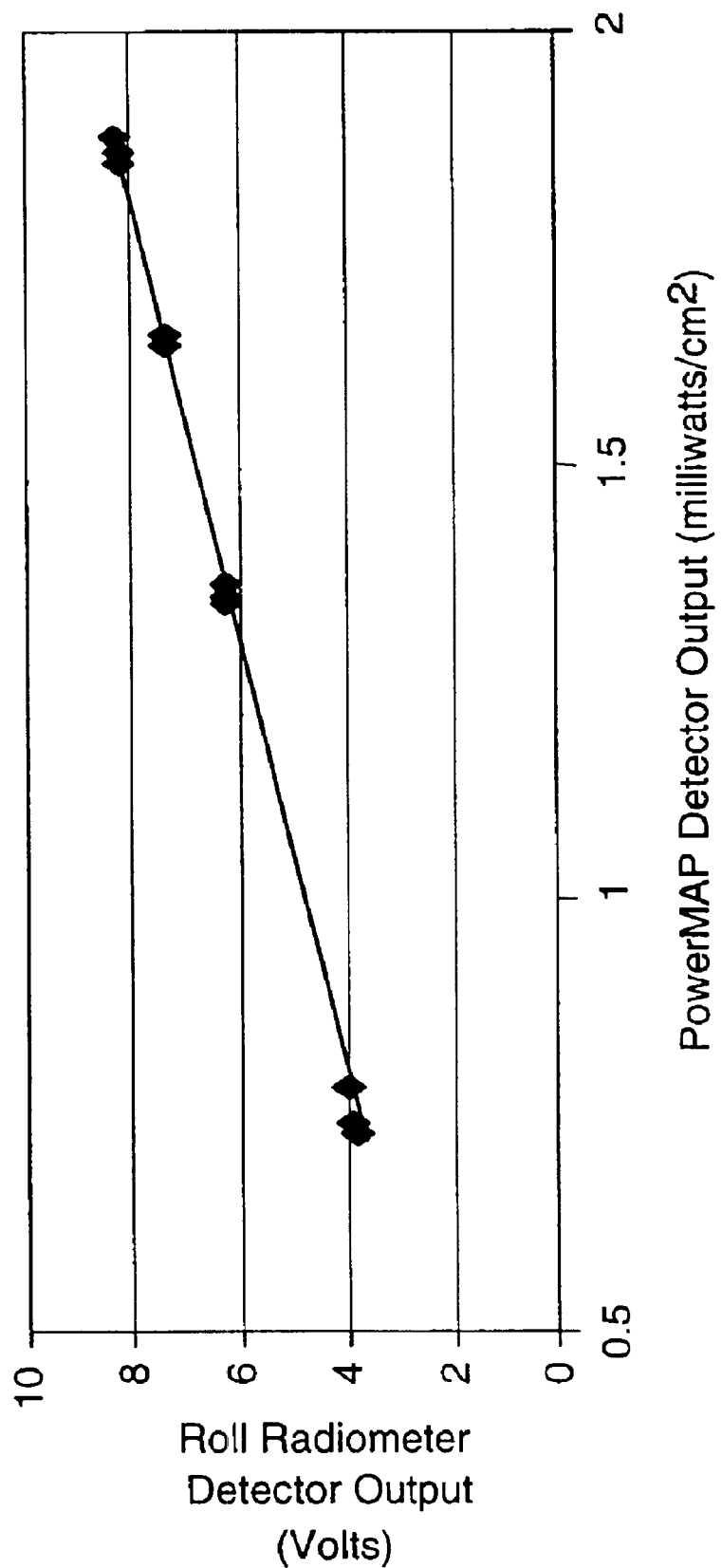
FIG. 9 is a graph showing an exemplary calibration graph for the inventive energy collection device.

An exemplary calibration and use of the inventive energy collection apparatus 10 was performed and sample data collected. Referring to FIGS. 1–4, 5, and 6, the measurement instruments 80 were calibrated by fixing in place the collection device 58, in a plane facing a Fusion D lamp manufactured by Fusion UV systems, Gaithersburg, Md. (radiation source). A bracket was designed to fix a calibrated measurement instrument (an EIT UV PowerMAP ™, manufactured by EIT, Sterling, device 58 such that an equivalent radiation path was created from the lamp to both the PowerMAP™ and the collection device 58. The power was varied to the lamp to change the output of the lamp. The voltage output produced by the EIT UV sensors and the power measured by the PowerMAP™ detector were plotted to produce a volt—milliwatt/cm$^2$ curve thereby transferring the PowerMAP™ calibration to the EIT UV sensors. FIG. 9 illustrates an example of such a calibration for the UVA region. Calibrating the system in this manner allows a convenient transfer of calibration to a production line using the inventive apparatus.

The roll utilized in the present example was 23¾ inches (60.325 cm) long and had a diameter of about 12 inches (30.48 cm). The roll included a slot 32 that extended about 23 inches (58.24 cm), or substantially the entire longitudinal length of jacket 26. Additionally, slot 32 was between approximately ¼ inch (6.35 mm) to approximately ½ inch (12.7 mm) wide. The instrument assembly 12, supported on plate 50 was secured internally in the roll. The plate 50 was approximately 8–10 inches (20.3–25.4 cm) wide and approximately 23 inches (54.4 cm) long. A collection device 58 extended into the slot 32. The roll was mounted on a UV housing equipment stand that allows a web to be passed around the roll. Two rows of one pair each (four lamps total) of Fusion D lamps are mounted such that the radiation is focused on the surface of the roll. A nip was mounted in such a manner so as to hold a web in place and have a clearance distance of no less than 25 microns. No web was used for this experiment. The mounting brackets were standard brackets known to the industry that allows substantial alignment of the bearings and roll upon each removal and seating.

Figure 10:
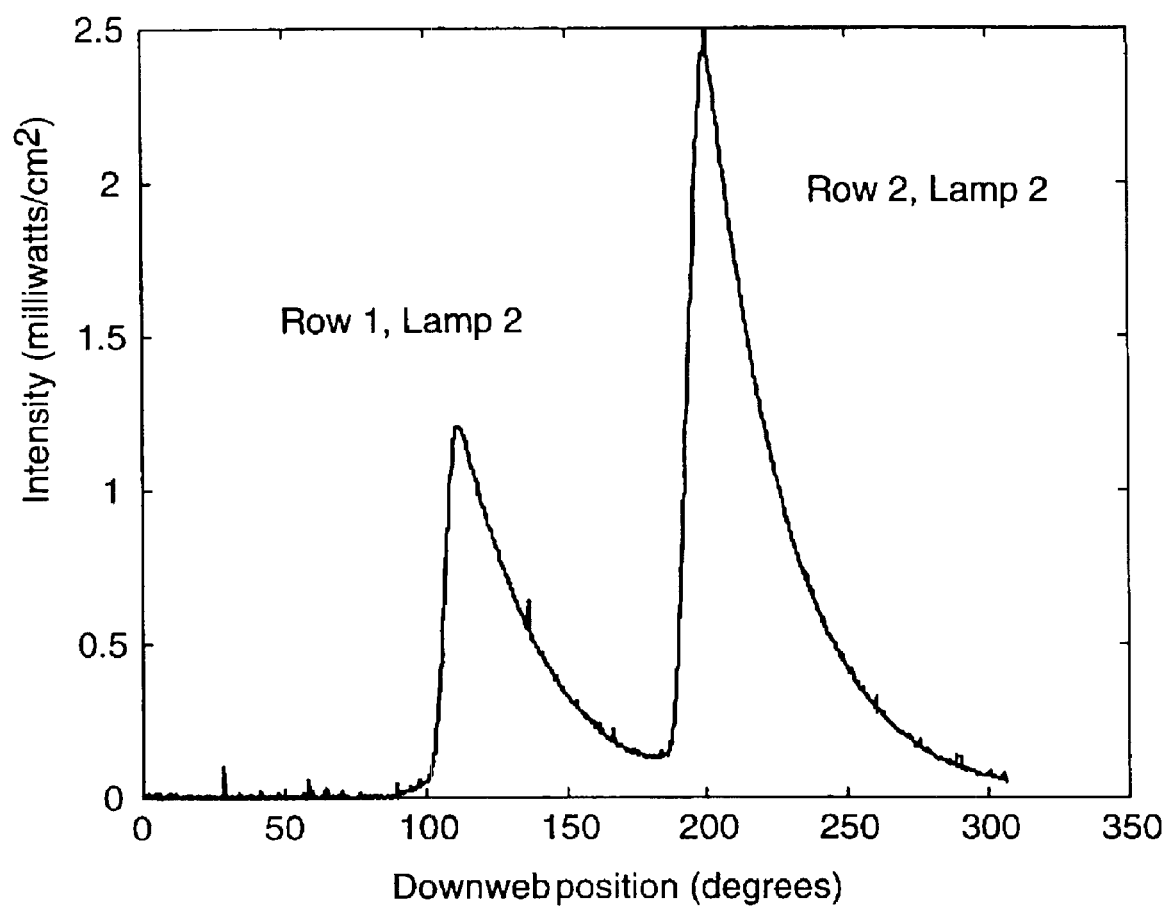
FIG. 10 is a graph showing exemplary data collected by the inventive energy collection device.

The roll was mounted such that the process line control could rotate the roll to any speed at which the process is designed to run. The line speed was set at 75 feet per minute (23 m/min) and the lamps were set at 60% full power and allowed to warm up for approximately 5 minutes. Cooling water running through the jacket 26, kept the internal roll cavity at a temperature of 75–80° F. (24–27° C.). The mount assembly 64 was positioned to be at the center of one of the UV lamps and stayed fixed while the roll rotated. Data was collected at a rate of 3000 Hz and the start and stop of the data sequence was controlled by triggering off of a fiduciary mark on the side of the roll. The data was averaged by aligning the trigger points in order to increase the signal to noise ratio of the data. FIG. 10 shows the data from a once around data collection of the radiation with the optic bundle in a fixed position. The plot shows the intensity in milliwatts/cm² of two lamps (Row 1, lamp 2 and Row 2, lamp 2) at the UVA wavelength versus the angular position of the viewing slit in space. Zero degrees are referenced to 12 o'clock when looking at the end of the roll. Data was collected for 306 degrees of the entire 360-degree path.

Table 1 shows the resulting dose calculated for all four of the lamps in the UVA wavelength using a slice of data corresponding to the center of the bulb compared to the previously generated calibration graph of FIG. 9.

TABLE I

UVA dose at 75 FPM

| Source | millijoules/cm² |
|---|---|
| Row 1, lamp 1 | 61.4 |
| Row 1, lamp 2 | 40.9 |
| Row 2, lamp 1 | 58.2 |
| Row 2, lamp 2 | 85.2 |

Figure 11:
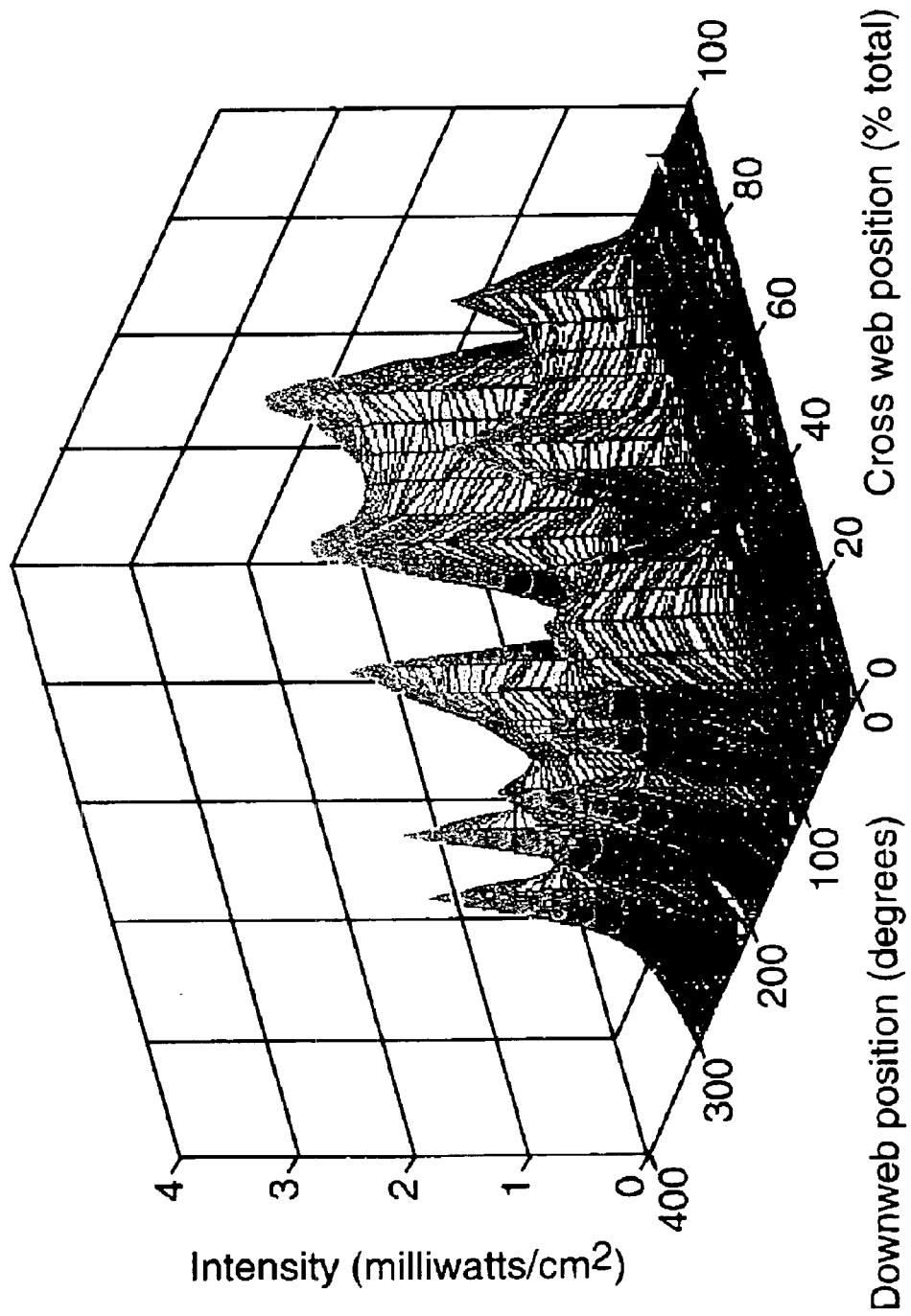
FIG. 11 is a graph showing exemplary data collected by the inventive energy collection device.

The optic bundle was then sequentially scanned across the entire length of the roll in 0.5 inch (12.7 mm) increments. Scanning the collection device longitudinally along the roll while simultaneously rotating the roll produced the three dimensional UV intensity map of the lamp output, illustrated in FIG. 11. FIG. 11 illustrates the distribution of UVA radiation intensity for each lamp in each row with high resolution.

Although the present invention has been described with reference to preferred embodiments, workers skilled in the art will recognize that changes may be made in form and detail without departing from the spirit and scope of the invention.

What is claimed is:

1. A method for collecting radiation comprising:
   disposing an electromechanical radiation collection device in a rotating roll to collect radiation impinging the roll, wherein the roll has an outer surface and the collection device is disposed at a plane tangential to the outer surface.

2. A method for collecting radiation comprising:
   disposing an electromechanical radiation collection device in a rotating roll to collect radiation impinging the roll, wherein the roll has an outer surface and the collection device is disposed radially inward from a plane tangential to the outer surface.

3. A method for collecting radiation comprising:
   disposing an electromechanical radiation collection device in a rotating roll to collect radiation impinging the roll, and further comprising:
   emitting radiation from a radiation source; and
   disposing a web between the radiation source and the roll.

4. A method for collecting radiation comprising:
   disposing an electromechanical radiation collection device in a rotating roll to collect radiation impinging the roll, and further comprising:
   emitting radiation from a radiation source; and
   disposing a web between the radiation source and the roll, wherein the roll includes an outer surface having a series of patterns, which forms seams between the patterns and further comprises:
   disposing the collection device at a seam at the outer surface.

5. A method for collecting radiation comprising:
   disposing an electromechanical radiation collection device in a rotating roll to collect radiation impinging the roll, and further comprising:
   emitting radiation from a radiation source; and
   disposing a web between the radiation source and the roll, wherein the web includes at least one coating layer.

6. A method for collecting radiation comprising:
   disposing an electromechanical radiation collection device in a rotating roll to collect radiation impinging the roll, and further comprising:
   emitting radiation from a radiation source; and
   measuring characteristics of the collected radiation, and further
   comprising: calibrating the radiation source using measured characteristics.

7. A method for collecting radiation comprising:
   disposing an electromechanical radiation collection device in a rotating roll to collect radiation impinging the roll, and further comprising:
   emitting radiation from a radiation source; and
   disposing a web between the radiation source and the roll further comprising:
   collecting radiation at a plurality of points transversely across the web.

8. A method for collecting radiation comprising:
   disposing an electromechanical radiation collection device in a rotating roll to collect radiation impinging the roll, wherein the radiation collected is particle type radiation.

9. A method for collecting radiation comprising:
   disposing an electromechanical radiation collection device in a rotating roll to collect radiation impinging the roll, and further comprising:
   measuring characteristics of the radiation, wherein said measured characteristic includes at least one of, energy present in the collected radiation, energy distribution of the collected radiation, polarization of the collected radiation, or accelerated particles in the collected radiation.

10. A method for collecting radiation comprising:
    disposing an electromechanical radiation collection device in a rotating roll to collect radiation impinging the roll, and further comprising:
    emitting radiation from a first radiation source;
    disposing a first web between the radiation source and the roll;
    collecting radiation with the collection device;
    measuring characteristics of the collected radiation;
    emitting radiation from a second radiation source;
    disposing a second web between the radiation source and the roll;
    collecting radiation with the collection device;
    measuring characteristics of the collected radiation; and
    comparing the measured characteristics of the radiation collected from the first radiation source with the radiation collected from the second radiation source.

11. A method for measuring radiation comprising:
    disposing a radiation collecting device in a rotating roll wherein the roll has an outer surface and the collection device is disposed at a plane tangential to the outer surface;

disposing a web between a radiation source and the collection device;

collecting radiation directed at the roll; and measuring characteristics of the collected radiation.

12. An apparatus of comprising:

a rotating roll having an outer surface; and a radiation collection device disposed in the roll, and further comprising:
  a radiation source; and
  a web disposed about a portion of the roll wherein the web is disposed between the radiation source and the roll.

13. An apparatus comprising:

a rotating roll having an outer surface; and a radiation collection device disposed in the roll and further comprising:
  a radiation source; and
  a web disposed about a portion of the roll wherein the web is disposed between the radiation source and the roll.

14. An apparatus comprising:

a rotating roll having an outer surface; and a radiation collection device disposed in the roll, and further comprising:
  an opening sufficient to allow passage of radiation disposed in the outer surface of the roll, wherein the collection device is disposed within the opening.

15. An apparatus comprising:

a rotating roll having an outer surface; and a radiation collection device disposed in the roll, and further comprising:
  an opening sufficient to allow passage of radiation disposed in the outer surface of the roll, wherein the collection device is disposed within the opening, and further comprising:
    a drive assembly connected to the collection device, wherein the drive assembly operates to translate the collection device along the length of the opening.

16. An apparatus comprising:

a rotating roll having an outer surface; and a radiation collection device disposed in the roll and further comprising:
  an opening sufficient to allow passage of radiation disposed in the outer surface of the roll, wherein the collection device is disposed within the opening, wherein the opening traverses the longitudinal length of the roll.

17. An apparatus comprising:

a rotating roll having an outer surface; and a radiation collection device disposed in the roll, and further comprising:
  an opening sufficient to allow passage of radiation disposed in the outer surface of the roll, wherein the collection device is disposed within the opening, wherein the opening is covered by a window transparent to radiation collected by the collection device.

18. An apparatus comprising:

a rotating roll having an outer surface and an opening sufficient to allow passage of radiation disposed in the outer surface;

a radiation collection device movably disposed in the opening;

a measurement device remotely disposed from the collection device and connected to the collection device so as to receive radiation collected by the collection device; and a drive assembly connected to the collection device, wherein the drive assembly operates to translate the collection device along the length of the opening.

* * * * *

UNITED STATES PATENT AND TRADEMARK OFFICE
CERTIFICATE OF CORRECTION

PATENT NO. : 6,952,264 B2
DATED : October 4, 2005
INVENTOR(S) : Kuhns, David W.

It is certified that error appears in the above-identified patent and that said Letters Patent is hereby corrected as shown below:

Title page,
Item [56], References Cited, FOREIGN PATENT DOCUMENTS, delete the second instance of "JP 361231404 A *    10/1986    G01B/11/30".

Column 10,
Line 24, after "Sterling," insert -- VA) in the same plane as the collection --.

Column 11,
Line 66, delete "forms" and insert -- form --.

Column 12,
Lines 26 and 64, after "roll" insert -- , --.

Column 13,
Line 5, after "apparatus" delete "of".
Line 15, after "roll" insert -- , --.

Column 14,
Line 4, after "roll" insert -- , --.

Signed and Sealed this

Tenth Day of January, 2006

JON W. DUDAS
*Director of the United States Patent and Trademark Office*